(12) United States Patent
Padgette et al.

(10) Patent No.: US 8,498,928 B2
(45) Date of Patent: *Jul. 30, 2013

(54) METHOD AND SYSTEM FOR USING RISK TOLERANCE AND LIFE GOAL PREFERENCES AND RANKING TO ENHANCE FINANCIAL PROJECTIONS

(75) Inventors: Robert L. Padgette, Raleigh, NC (US); Timothy D. Paulin, Cary, NC (US)

(73) Assignee: Klein Decisions, Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,407

(22) Filed: Dec. 17, 2010

(65) Prior Publication Data

US 2011/0087622 A1      Apr. 14, 2011

Related U.S. Application Data

(63) Continuation of application No. 12/111,037, filed on Apr. 28, 2008, now Pat. No. 7,877,308.

(60) Provisional application No. 60/914,059, filed on Apr. 26, 2007.

(51) Int. Cl.
 *G06Q 40/00* (2012.01)
(52) U.S. Cl.
 CPC ..................................... *G06Q 40/00* (2013.01)
 USPC .......................................................... 705/38
(58) Field of Classification Search
 USPC ........... 705/35–45; 800/13–280; 435/6.1–325
 See application file for complete search history.

(56) References Cited

U.S. PATENT DOCUMENTS

| | | | |
|---|---|---|---|
| 5,918,217 A * | 6/1999 | Maggioncalda et al. | ... 705/36 R |
| 5,999,918 A | 12/1999 | Williams et al. | |
| 6,012,044 A | 1/2000 | Maggioncalda et al. | |
| 6,064,984 A | 5/2000 | Ferguson et al. | |
| 6,085,175 A | 7/2000 | Gugel et al. | |
| 6,219,650 B1 | 4/2001 | Friend et al. | |
| 6,275,814 B1 | 8/2001 | Giansante et al. | |
| 6,282,520 B1 | 8/2001 | Schirripa | |
| 6,292,787 B1 | 9/2001 | Scott et al. | |
| 6,313,833 B1 | 11/2001 | Knight | |

(Continued)

FOREIGN PATENT DOCUMENTS

WO    PCT/US03/32381      10/2003

OTHER PUBLICATIONS

Portions of the file history of U.S. Appl. No. 10/771,709.

(Continued)

*Primary Examiner* — Bruce I Ebersman
(74) *Attorney, Agent, or Firm* — Nelson Mullins Riley & Scarborough LLP

(57) ABSTRACT

A system and method directed to improving efforts to plan for investor life goals. The method combines unique approaches of assessing investor risk tolerance using utility theory and investor preferences using conjoint analysis, Analytic Hierarchy Process ("AHP"), or the like in combination with existing industry financial projection methods using linear projections, Monte Carlo simulation, or the like. Further, the method improves upon existing financial projection approaches with the addition of regression techniques to streamline adjustments to the plan objectives, resources, and constraints. The method includes a means of determining an optimal combination of attribute preferences that have an acceptable probability of achieving plan goals while maximizing investor satisfaction as measured by total utility.

18 Claims, 14 Drawing Sheets

U.S. PATENT DOCUMENTS

| | | |
|---|---|---|
| 6,336,102 B1 | 1/2002 | Luskin et al. |
| 6,397,212 B1 | 5/2002 | Biffar |
| 6,405,179 B1 | 6/2002 | Rebane |
| 6,430,542 B1 | 8/2002 | Moran |
| 6,484,151 B1 | 11/2002 | O'Shaughnessy |
| 6,801,199 B1 | 10/2004 | Wallman |
| 6,826,541 B1 | 11/2004 | Johnston et al. |
| 7,177,831 B1 | 2/2007 | O'Shaughnessy et al. |
| 7,249,080 B1 | 7/2007 | Hoffman et al. |
| 7,624,069 B2 | 11/2009 | Padgette et al. |
| 7,689,493 B1 * | 3/2010 | Sullivan et al. ............ 705/36 R |
| 2001/0021911 A1 | 9/2001 | Ohmoto et al. |
| 2001/0027437 A1 | 10/2001 | Turbeville et al. |
| 2001/0042036 A1 | 11/2001 | Sanders |
| 2001/0056391 A1 | 12/2001 | Schultz |
| 2002/0002521 A1 | 1/2002 | Shearer et al. |
| 2002/0042764 A1 | 4/2002 | Gardner et al. |
| 2002/0062271 A1 | 5/2002 | Breuninger |
| 2002/0062272 A1 | 5/2002 | Kim et al. |
| 2002/0087388 A1 | 7/2002 | Keil et al. |
| 2002/0091604 A1 | 7/2002 | Loeper |
| 2002/0091605 A1 | 7/2002 | Labe, Jr. et al. |
| 2002/0107770 A1 | 8/2002 | Meyer et al. |
| 2002/0111890 A1 | 8/2002 | Sloan et al. |
| 2002/0199195 A1 | 12/2002 | Townsend et al. |
| 2004/0172357 A1 | 9/2004 | Padgette |

OTHER PUBLICATIONS

A Sensible Mutual Fund Selection Model, by Hakan Saraoglu and Miranda Lam Dietzler, pp. 60-72 (2002).

* cited by examiner

INVESTMENT DECISION TOOL

LOGGED IN AS JOHN DOE

CURRENT SCENARIO: PORTFOLIO SELECTION

| PRODUCT SELECTION | RISK TOLERANCE | PREFERENCE | RESULTS |

BACK TO SCENARIO MANAGEMENT

VIEW REPORTS

STEP 1: SELECT ATTRIBUTES

FROM THE LIST BELOW, CLICK ON THE BOX NEXT TO EACH ATTRIBUTE THAT HAS SOME LEVEL OF IMPORTANCE TO YOU. TO UNCHECK AN ATTRIBUTE, CLICK THE BOX AGAIN.

RETIREMENT GOALS

- ☑ RETIREMENT AGE
- ☑ RETIREMENT INCOME
- ☐ NURSING HOME PROTECTION

ESTATE AND EDUCATION GOALS

- ☑ AMOUNT LEFT TO HEIRS
- ☐ EDUCATION OF CHILDERN/GRANDCHILDREN

SAVINGS AND INVESTMENT

- ☑ ANNUAL SAVINGS AMOUNT
- ☑ INVESTMENT RISK LEVEL

*FIG. 2A*

GOALS

ENVISION CONSIDERS ALL OF YOUR LIFESTYLE GOALS AND WHAT YOU IDEALLY WOULD LIKE TO ACHIEVE. PLEASE HELP US UNDERSTAND YOUR GOALS.

1. RETIREMENT AGE
   - ACCEPTABLE: 67
   - IDEAL: 62

2. RETIREMENT INCOME
   - ACCEPTABLE: 75% OF PRE RETIREMENT INCOME
   - IDEAL: 90% OF PRE RETIREMENT INCOME

3. AMOUNT LEFT TO HEIRS
   - ACCEPTABLE: $ 200,000
   - IDEAL: $ 300,000

4. ANNUAL SAVINGS
   - ACCEPTABLE: 6% OF SALARY
   - IDEAL: 3% OF SALARY

5. RISK LEVEL
   - ACCEPTABLE: MODERATE
   - IDEAL: CONSERVATIVE

CURRENT AGE: 50
LIFE EXPECTANCY: 83

*FIG. 2B*

CURRENT SCENARIO: PORTFOLIO SELECTION                    LOGGED IN AS JOHN DOE

INVESTMENT DECISION TOOL

| PRODUCT SELECTION | RISK TOLERANCE | PREFERENCE | RESULTS |

VIEW REPORTS

BACK TO SCENARIO MANAGEMENT

STEP 2: IMPORTANCE OF DIFFERENCE RATINGS

USING THE SCALE PROVIDED, CLICK ON THE RESPONSE THAT INDICATES THE IMPORTANCE OF DIFFERENCE TO YOU BETWEEN THE HIGH AND LOW VALUE FOR THIS ATTRIBUTE.

AFTER COMPLETING YOUR SELECTION, CLICK "NEXT" TO PROCEED.

HOW IMPORTANT IS THE DIFFERENCE BETWEEN...

| RETIRING AT 62 | —VERUS— | RETIRING AT 65 |

| EXTREMELY IMPORTANT | VERY IMPORTANT | IMPORTANT | SOMEWHAT IMPORTANT | NOT IMPORTANT |
|---|---|---|---|---|
| ○ | ○ | ○ | ○ | ○ |

[PREVIOUS] [NEXT]

CURRENT SCENARIO: PORTFOLIO SELECTION
LOGGED IN AS JOHN DOE

| PRODUCT SELECTION | RISK TOLERANCE | PREFERENCE | RESULTS |

INVESTMENT DECISION TOOL

BACK TO SCENARIO MANAGEMENT
VIEW REPORTS

STEP 2: IMPORTANCE OF DIFFERENCE RATINGS

USING THE SCALE PROVIDED, CLICK ON THE CIRCLE BELOW THE RESPONSE THAT BEST INDICATES THE IMPORTANCE OF DIFFERENCE TO YOU BETWEEN A DESIRABLE AND UNDESIRABLE OUTCOME.

AFTER COMPLETING YOUR SELECTION, CLICK "NEXT" TO PROCEED.

HOW IMPORTANT IS THE DIFFERENCE BETWEEN...

RETIRING WITH $100,000 INCOME —VERUS— RETIRING WITH $70,000 INCOME

| EXTREMELY IMPORTANT | | VERY IMPORTANT | | IMPORTANT | | SOMEWHAT IMPORTANT | | NOT IMPORTANT |
|---|---|---|---|---|---|---|---|---|
| O | O | O | O | O | O | O | O | O |

[ PREVIOUS ]  [ NEXT ]

*FIG. 3C*

RETIREMENT INCOME OBJECTIVE

OBJECTIVES: STEP 2 OF 5

HOW MUCH OF YOUR SALARY WOULD YOU LIKE TO REPLACE DURING RETIREMENT? [90%] ($166,189 AT AGE 62)

HOW MUCH OF YOUR SALARY DO YOU NEED TO REPLACE DURING RETIREMENT? [75%] ($138,491 AT AGE 62)

HOW IMPORTANT IS RETIRING WITH 90% OF YOUR PRE-RETIREMENT SALARY VERSUS RETIRING WITH 75%?

EXTREMELY IMPORTANT — VERY IMPORTANT — IMPORTANT — SOMEWHAT IMPORTANT — NOT IMPORTANT

CURRENT STRATEGY ▷ ASSUMPTIONS ▷ OBJECTIVES ▷ SUGGESTED STRATEGY

WELCOME JOHN DOE (?) ROLL OVER THE ICONS FOR MORE INFORMATION AND AN EXPLANATION OF FIELD REQUIREMENTS.

[PREVIOUS STEP] [NEXT STEP]

*FIG. 3D*

INVESTMENT DECISION TOOL

CURRENT SCENARIO: PORTFOLIO SELECTION                    LOGGED IN AS JOHN DOE

| PRODUCT SELECTION | RISK TOLERANCE | PREFERENCE | RESULTS |

BACK TO SCENARIO MANAGEMENT                              VIEW REPORTS

STEP 3: TRADE-OFF QUESTIONS

YOU WILL NOW BE PRESENTED WITH A SERIES OF "TRADE-OFF" QUESTIONS. USING THE SCALE PROVIDED, RATE THE DEGREE OF PREFERENCE YOU HAVE BETWEEN THE TWO ALTERNATIVES. THEN CLICK "NEXT" TO PROCEED.

WHICH DO YOU PREFER...

| RETIRING AT 62 AND RETIRING WITH $70,000 INCOME | -VERUS- | RETIRING AT 65 AND RETIRING WITH $100,000 INCOME |

STRONGLY PREFER LEFT   o   o   o   o   NO PREFERENCE   o   o   o   o   STRONGLY PREFER RIGHT

[PREVIOUS]  [NEXT]

*FIG. 4A*

OBJECTIVE TRADE-OFFS

FOR EACH OF THE SIX COMBINATIONS OF OBJECTIVES BELOW, INDICATE WHICH OBJECTIVE IS MORE IMPORTANT TO YOU.

IS IT MORE IMPORTANT TO... OR TO...

RETIRE EARLIER — MUCH MORE | MORE | EQUAL | MORE | MUCH MORE — RETIRE WITH MORE INCOME

RETIRE WITH MORE INCOME — MUCH MORE | MORE | EQUAL | MORE | MUCH MORE — SAVE LESS

TAKE LESS RISK — MUCH MORE | MORE | EQUAL | MORE | MUCH MORE — RETIRE EARLIER

SAVE LESS — MUCH MORE | MORE | EQUAL | MORE | MUCH MORE — RETIRE EARLIER

RETIRE WITH MORE INCOME — MUCH MORE | MORE | EQUAL | MORE | MUCH MORE — TAKE LESS RISK

TAKE LESS RISK — MUCH MORE | MORE | EQUAL | MORE | MUCH MORE — SAVE LESS

WELCOME JOHN DOE

CURRENT STRATEGY ▷ ASSUMPTIONS ▷ OBJECTIVES ▷ SUGGESTED STRATEGY

OBJECTIVES: STEP 5 OF 5

[PREVIOUS STEP] [NEXT STEP]

*FIG. 4B*

OBJECTIVES AND PRIORITIES SUMMARY

YOUR OBJECTIVES

YOUR OBJECTIVES DEFINE WHAT YOU WOULD LIKE TO ACHIEVE. CLICK THE 'CHANGE' BUTTON TO MAKE CHANGES.

RETIREMENT AGE — YOU WOULD LIKE TO RETIRE AT 62 BUT YOU ARE WILLING TO WORK TO 67.

RETIREMENT INCOME — YOU WOULD LIKE TO REPLACE 90% OF YOUR SALARY DURING RETIREMENT, BUT YOU ARE WILLING TO ACCEPT 75% OF SALARY

SAVINGS — YOU WOULD LIKE TO SAVE 3% OF YOUR SALARY EACH YEAR BUT ARE WILLING TO SAVE 10% OF YOUR SALARY.

INVESTMENT RISK — YOU WOULD PREFER TO MINIMIZE LOSSES BUT YOU CAN ACCEPT A LOSS OF 20% IN A POOR YEAR.

YOUR PRIORITIES

YOUR PRIORITIES REFLECT WHICH OBJECTIVES ARE MORE IMPORTANT TO ACHIEVE. THE HIGHER THE PERCENTAGE, THE MORE IMPORTANT THE OBJECTIVE.

| RETIREMENT AGE | RETIREMENT INCOME | SAVINGS | INVESTMENT RISK |
|---|---|---|---|
| 39% | 29% | 14% | 18% |

*FIG. 5B*

METHOD AND SYSTEM FOR USING RISK TOLERANCE AND LIFE GOAL PREFERENCES AND RANKING TO ENHANCE FINANCIAL PROJECTIONS

CLAIM OF PRIORITY

The present application is a continuation U.S. patent application Ser. No. 12/111,037 (entitled "Method and System for Using Risk Tolerance and Life Goal Preferences to Enhance Financial Projections" and filed on Apr. 28, 2008), which claimed the benefit of the U.S. provisional patent application No. 60/914,059 (entitled "Method and System for Using Risk Tolerance and Life Goal Preferences to Enhance Financial Projections" and filed on Apr. 26, 2007), the entire disclosure of each of which is hereby incorporated by reference as if set forth verbatim herein and relied upon for all purposes.

FIELD OF THE INVENTION

The present invention relates to decision making or the like, and more particularly to a method and system to improve upon financial advice approaches to investor goal planning and projections.

BACKGROUND OF THE INVENTION

Successful planning for life's financial goals is a difficult and, too often, misunderstood process. The effort requires an accurate assessment of an individual's or family's goals and constraints combined with quantitative techniques to forecast the probability of success. Even with an accurate model, the plan will only ultimately succeed if the courses of action prescribed in the plan are followed and the plan is updated and adjusted to account for incorrect assumptions and changes that occur over time.

The financial planning exercise is a matter of allocating resources (e.g., current savings, future savings) to achieve future goals (e.g., retirement age, retirement income). Allocating resources among alternatives, particularly between complex alternatives with multiple aspects and considerations, can be extremely difficult. An investment professional may make the decision seem easier but there are over 600,000 financial advisors with varying experience and expertise and employed in different capacities, such as financial planners, financial consultants, stock brokers, insurance agents, and the like to name a few such titles. While many investors may use an investment professional to assist in planning for their futures, there are millions of investors who are struggling to make these decisions on their own with little or no assistance. Probably the largest group of non-assisted investors is in the 401(k) market where there are now more than 40 million accounts. Besides an individual's personal residence, a 401(k) plan is often the largest investment an individual may have, yet these decisions are often made with little background knowledge and inadequate or overly-complicated tools.

Even when assisted by investment professionals, many investors find the financial planning exercise cumbersome, intrusive, and hard to comprehend. Often, this is due to the static nature of the client discovery process and that little, if any, consideration may be given to quantifying personal considerations and preferences. Very little time is spent understanding how the investor differentiates the value of various goals, resources, and constraints. As such, most of the process and results focus on the validity of the mathematical models used in the planning effort. For example, most financial planning questionnaires start by asking the investor questions like:

When do you want to retire?
How much income do you want during retirement?
How much can you save per year?
Are you a conservative/moderate/aggressive investor?

Based on these inputs, the planning tools calculate a projected future value and/or a probability of success in achieving the stated goals subject to the stated resources, constraints and assumptions.

Rarely does the planning process include an effort to determine how the investor differentiates the value of the various goals, constraints, and resources described in the plan. Without this differentiation, financial planning can be an exhausting, iterative process to find the combination of goals and resources that have the right look or feel to the advisor and/or investor. And, because there is no ability to quantifiably link what's important to the investor to what's suggested by the planning model, many investors are incapable or unwilling to fully implement the plan. A method that combines the ability to assess the probability of achieving the goals with differentiation of the value of the investor's goals, constraints, and resources will allow the investor to determine the optimal combination of required probability and satisfaction with the plan. This optimization process allows the investor to arrive at a single combination of goals, constraints, and resources that achieves both probability and satisfaction objectives.

Often, the financial projection is completed without a separate assessment of investor risk tolerance. Without a risk tolerance assessment, the financial projection may result in a recommendation of investments that exceed the risk level that the investor can withstand when that risk is translated into losses in the investor's portfolio. Risk tolerance assessment is often used to determine the ability of the investor to "stay the course" in light of volatility of the financial markets and the investor's portfolio. The investor's risk tolerance is used to select a suitable investment strategy matching the investor's return and risk profile. Typically, the risk tolerance assessment is a simple, scored questionnaire. Financial projection tools may be separately used to determine the probability of the strategy achieving the investor's long-term goals. In many cases, there is a conflict between the risk level suggested by the risk tolerance assessment and the risk level necessary to achieve the goals described in the plan. While other investor-controlled inputs (e.g., desired retirement age, desired retirement income, savings rate, desired college spending) could be adjusted to improve the probability of success, the risk of the investment strategy is frequently one of the first items adjusted in an effort to enhance probability of achieving investor objectives. This step can lead to the inability of the investor to stick with the long-term plan when losses associated with increased risk are realized.

There is a need for a complementary process to typical financial projection tools using forecasts or Monte Carlo simulation. Such a method or system will determine a target or maximum level of suitable portfolio risk; assess investor preferences and priorities with regard to their financial goals, resources, and constraints; and optimize a financial plan by simultaneously addressing and quantifying the probability of achieving long-term investor objectives along with the satisfaction level of the investor with the level of objectives, resources, and constraints necessary to attain that level of probability.

SUMMARY OF THE INVENTION

The present invention recognizes and addresses the foregoing considerations, and others, of prior art construction and methods.

In one aspect, the present invention provides a method directed to improving efforts to plan for investor life goals. The method combines unique approaches of assessing investor risk tolerance using utility theory and investor preferences using conjoint analysis, Analytic Hierarchy Process ("AHP"), or the like in combination with existing industry financial projection methods using linear projections, Monte Carlo simulation, or the like. Further, the method improves upon existing financial projection approaches with the addition of regression techniques to streamline adjustments to the plan objectives, resources, and constraints. The method includes a means of determining an optimal combination of attribute preferences that have an acceptable probability of achieving plan goals while maximizing investor satisfaction as measured by total utility.

Background information directed to conjoint analysis known to those of ordinary skill in the art can be found in PAUL E., GREEN & YORAM WIND, MARKET RESEARCH AND MODELING: PROGRESS AND PROSPECTS, MONTE CARLO SIMULATION 117-68 (2003), and is incorporated by reference herein. Background information directed to AHP known to those of ordinary skill in the art can be found in Hakan Saraoglu & Miranda L A M Detzler, *A Sensible Mutual Fund Selection Model*, FINANCIAL ANALYSTS JOURNAL, May/June issue, at 60-72 (2002), and is incorporated by reference herein. Background information directed to Monte Carlo simulations known to those of ordinary skill in the art can be found in JOHN L. MAGINN & DONALD L. TUTTLE, MANAGING INVESTMENT PORTFOLIOS 7-47 to 7-48 (1980), and is incorporated by reference herein. Background information directed to regression techniques known to those of ordinary skill in the art can be found in JEROME L. VALENTINE & EDMUND A. MENNIS, QUANTITATIVE TECHNIQUES FOR FINANCIAL ANALYSIS 121-57 (1980), and is incorporated by reference herein.

In accordance with an embodiment of the present invention, a method for selecting between a plurality of life goal alternatives may include determining a risk tolerance for a user. A plurality of life goal attributes related to the alternatives may be presented for selection by the user, and the alternatives may be ranked by relative importance in response to conjoint analysis, or the like, of the plurality of attributes.

In accordance with another embodiment of the present invention, a method for selecting between a plurality of alternatives may include presenting a plurality of risk tolerance questions to a user. A risk tolerance for the user may then be measured based on responses of the user to the plurality of risk tolerance questions. A plurality of attributes related to the life goal alternatives may be presented for selection by the user, and an analysis of the attributes selected by the user may be performed by conjoint analysis or the like. The alternatives may be ranked in response to the analysis of the attributes selected by the user. The risk tolerance may be used to enhance the appropriateness of the financial projection calculations for the user.

In accordance with a further embodiment of the present invention, a computer-readable medium having computer-executable instructions may be provided for performing a method that includes determining a risk tolerance for a user. A plurality of attributes may be presented for selection by the user, and the alternatives may be ranked in response to conjoint analysis or the like of the plurality of attributes. The risk tolerance may be used to enhance the appropriateness of the financial projection calculations for the user.

In accordance with another embodiment of the present invention, a system for selecting between a plurality of alternatives may include a plurality of attributes and a user interface generator adapted to present the plurality of attributes for the user to select those attributes of importance to the user. A conjoint analysis program or similar program may be included to determine user preferences of the life goal alternatives based on analysis of the attributes selected by the user.

The methods are developed to complement a financial projection engine using Monte Carlo simulation or the like which determines expected future wealth or the probability of achieving user objectives subject to user resources and constraints. The financial projection engines gather information regarding user objectives, resources, and constraints, and assumptions are made with regard to various future determinants of wealth and probability. Typically, these assumptions include such items as return and risk of the investment strategy, inflation rate, and tax rates. Based on that information, financial projections are calculated by:

Producing a future cash flow analysis and determining the projected terminal wealth at the end of the user's time horizon, and/or Producing a future cash flow analysis and simulating various outcomes for one or more attributes of the plan (typically investment return).

Some financial projection tools incorporate analysis of target and satisfactory levels of attributes. These tools focus on calculating the probability of achieving those levels rather than the satisfaction or utility that will be produced by achieving particular levels. Most financial projection tools ask the user for single point targets for objectives, resources, and constraints. Examples might be retirement age=62, savings rate=$10,000 per year, and retirement income=$80,000 per year. In such cases, the method will require the user to provide the "satisfactory levels" for each attribute as additional information. Examples compared to the previous targets might have satisfactory levels of retirement age=66, savings rate=$14,000 per year, and retirement income=$50,000 per year. The end result of the probability-based financial projections is a percentage probability (sometimes transformed to categories, graphics, or alternate scoring models) of achieving user objectives subject to user resources and constraints. When the probability of achieving objectives is judged too low by the user or his/her advisor, a series of scenarios or what-if analyses is performed to assess alternate levels that would result in a reasonable probability of achieving the objectives. This effort is subjective and iterative, typically requiring multiple iterations to arrive at a solution that makes adjustments that are acceptable to the user.

In yet another aspect of the present invention, the method may include a regression-based approach to simplify the what-if scenario analyses process. The regression analysis determines an estimated change in probability of achieving plan objectives for changes in the user's objectives, resources, and constraints in order to simplify and streamline the what-if analysis required when the probability of achieving plan goals is lower than desired.

The method may include an optimization process to determine maximum satisfaction with life goal attribute levels subject to minimum probability of achieving objectives, maximum probability of achieving objectives subject to minimum satisfaction with plan attribute levels and/or maximum combination of probability of achieving objectives and satisfaction with plan attribute levels. Alternatively, the preference-based factor model equation may be run simultaneously with a projection forecast simulation to calculate satisfaction for the given levels of objectives, resources, and constraints.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 2 through 7 are exemplary web interfaces to be used in accordance with an embodiment of the present invention.

Figure 1:
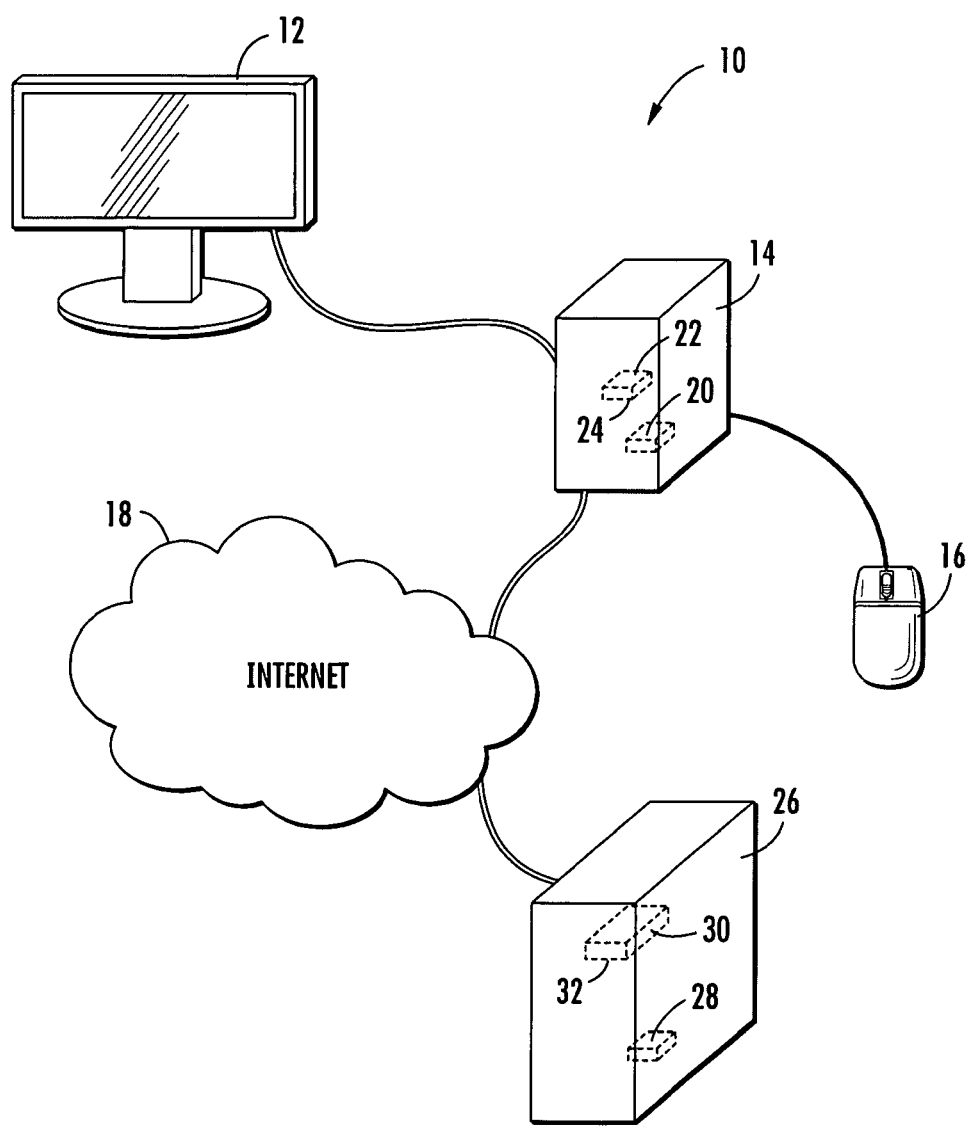
FIG. 1 is a schematic representation of a system for using risk tolerance and life goal preferences and rankings to enhance financial projections in accordance with an embodiment of the present invention.

Repeat use of reference characters in the present specification and drawings is intended to represent same or analogous features or elements of the invention.

DESCRIPTION OF THE INVENTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a system 10 for using risk tolerance and life goal preferences and rankings to enhance financial projections in accordance with an embodiment of the present invention. Referring to FIG. 1, system 10 includes a display 12, a computer 14, and an input device, such as a mouse 16 or a keyboard. Computer 14 may be connected to a local or distributed network, such as the Internet 18, and comprises a processing device 20 and computer readable memory 22, which may include at least one database 24. It should be understood that computer readable memory can be, for example, random access memory, a hard drive, a flash drive, a CD-ROM, a DVD, or a combination thereof. System 10 may also include additional computers connected to the Internet 18, such as server 26, which includes its own processing device 28 and computer readable memory 30 that may include one or more additional databases 32. In the presently-described embodiment, a program or program code is stored on computer readable memory 22 such that, when executed by processing device 20, performs the processes described below. In another embodiment, a portion of the program or program code is stored on computer readable memory of one or more additional computers connected to the network, such as computer 14.

The invention may use one of several methods for determining the maximum risk level or the risk tolerance of an investor.

One method for determining the maximum risk level is to present the user the risk exposure for different portfolios. These portfolios are constructed from different combinations of stocks, bonds, cash equivalents, or other asset classes and styles of investments. One example of how the user may choose a maximum acceptable level of risk can be based on either historical or expected risk and returns for the different portfolios, the expected frequency of negative returns, and the expected magnitude of a very bad year return. Certain regulatory restrictions do not permit the use of forecasted risk and return, so the invention may use one or the other. The user can pick a level of risk expressed by one or both of the above two variables, or other similar variables, that express the risk level that is acceptable, and that selection may identify the maximum risk portfolio as a constraint in financial projection algorithms.

Another method for the calculation of risk tolerance and certainty equivalent for alternative investment portfolios can be carried out using the method of Padgette described in United States Published Patent Application 2004/0172357, which is incorporated in its entirety by reference herein. Using the unique approach to risk tolerance measurement and the calculated certainty equivalent described by the method of Padgette described in United States Published Patent Application 2004/0172357 for each available investment strategy, the method may identify a maximum risk portfolio as a constraint in financial projection algorithms.

As simulations are conducted by the financial projection engine, the level of risk will be constrained to be no greater than the user's maximum acceptable risk or a suggested risk tolerance. This constraint allows the simulation engine to gauge the expected success of multiple potential investment outcomes, all of which have a risk level that is appropriate for the user.

The analysis of preferences portion may involve a conjoint analysis process or the like. An example of a conjoint analysis process is described in U.S. Pat. No. 6,826,541 entitled METHOD, SYSTEM, AND COMPUTER PROGRAM PRODUCTS FOR FACILITATING USER CHOICES AMONG COMPLEX ALTERNATIVES USING CONJOINT ANALYSIS by Jeff Johnston et al. and is incorporated in its entirety by reference herein.

A plurality of attributes related to the life goal alternatives may be presented for selection by the user. These attributes may further define the alternatives. FIG. 2A illustrates some examples of attributes for individual life goals. The user may select those attributes that are important to him, or the process may be constrained to ask each user questions regarding a static set of attributes. Then, the user identifies a target value and a satisfactory value for each of the selected attributes, such as Ideal Retirement Age of 62 and Acceptable Retirement Age of 66. The ideal and acceptable values are referred to as the first hypothetical and second hypothetical herein for purposes of the conjoint analysis. FIG. 2B illustrates some examples of the inputs for ideal and acceptable values described above.

In another embodiment, the system selects the attributes related to life goal alternatives. In this embodiment, the ideal value and the acceptable value would still be selected by the user. The ideal and acceptable values are referred to as the first hypothetical and second hypothetical herein for purposes of the conjoint analysis.

The user may be presented with a series of questions in order to select a degree of importance of difference between two hypothetical values for each attribute selected by the user or the system. The two hypothetical values are based on the acceptable values provided by the user. These importance of difference questions may include a first hypothetical paired with a second hypothetical for each attribute selected by the user. The user may select a degree of importance of difference between the first hypothetical and the second hypothetical. The first hypothetical may have a desirable value or setting of an attribute compared to the second hypothetical which may have a relatively undesirable value or setting for the attribute compared to the value of the attribute in the first hypothetical.

Figure 3B:
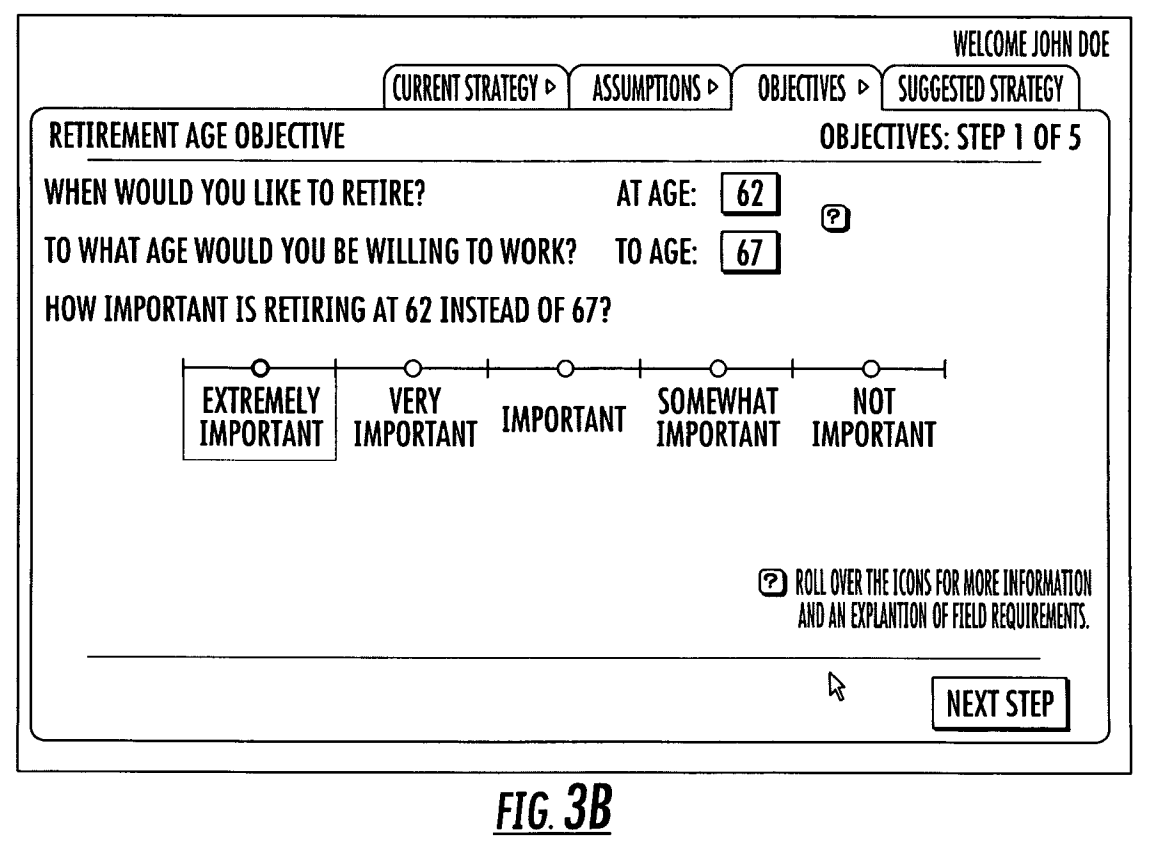

FIGS. 3A, 3B, 3C, and 3D are exemplary interfaces used to select the degree of importance for each attribute as selected by a user. In one embodiment as illustrated by FIGS. 3A and 3C, the user is presented with a first and second hypothetical and is able to select a degree of importance between the two. Referring to FIG. 3A, for example, the first hypothetical may present an Ideal Retirement Age of 62 and the second hypothetical may present an Acceptable Retirement Age of 65. Accordingly, the first hypothetical may have a first predetermined value and the second hypothetical may have a second predetermined that is lower than a predetermined value of the first hypothetical. The range of degrees of importance of difference may range up to 9 choices or more from extremely important, very important, important, somewhat important, and not important with varying degrees for selection by the user in between. Another example of an importance of degree of difference question is illustrated in the exemplary interface set forth in FIG. 3C directed to "Retirement Income."

In another embodiment as illustrated by FIGS. 3B and 3D, the user is able to select and modify the values corresponding to the first and second hypotheticals while at the same time answering the Importance of Difference question relative to the two hypothetical values for each attribute selected by the user or the system. For example, the exemplary interface illustrated by FIG. 3B allows the user to select and modify the Ideal Retirement Age and the Acceptable Retirement Age and, at the same time, select from a range of degrees of importance between the two. The exemplary interface illustrated by FIG. 3D allows the user to select and modify the ideal and acceptable percentages of pre-retirement income, while at the same time allows the user to select from a range of degrees of importance between the two. The range of degrees of importance of difference may range up to 9 choices or more from extremely important, very important, important, somewhat important and not important with varying degrees for selection by the user in between.

Next, a series of trade-off questions related to the attributes selected by the user or the system may be presented for the user to select a degree of preference. The series of trade-off questions may include presenting a plurality of sets of hypotheticals. Each set of hypotheticals may include a first pair of hypotheticals and a second pair of hypotheticals for the user to choose a degree of preference between the first pair of hypotheticals and the second pair of hypotheticals. Each first pair of hypotheticals may include a first hypothetical and a second hypothetical. The first hypothetical may have a predetermined value or setting of one attribute and the second hypothetical may have a predetermined value or setting of another attribute. Each second pair of hypotheticals may include a third hypothetical and a fourth hypothetical. The third hypothetical may have another predetermined value or setting of the one attribute lower than the predetermined value or setting of the first hypothetical and the fourth hypothetical may have another predetermined value or setting of the other attribute higher than the predetermined value of the other attribute in the second hypothetical. Accordingly, in the first pair of hypotheticals, a high value or more desirable hypothetical outcome of one attribute may be paired with a low value or less desirable hypothetical outcome of another attribute. In the second pair of hypotheticals, a low value or less desirable hypothetical outcome of the one attribute in the first pair of hypotheticals may be paired with a high value or more desirable hypothetical outcome of the other attribute in the first pair of hypotheticals. The user is then asked to select a degree of preference between the first pair of hypotheticals and the second pair of hypotheticals. The degree of preference may range from strongly preferring the first hypothetical to no preference between the paired hypotheticals to strongly preferring the second hypothetical with varying degrees of preference in between.

FIG. 4A illustrates an exemplary interface that allows the user to select a degree of preference. In the example shown in FIG. 4A, the user selects its preference between values for two attributes versus its preference for other values of the two attributes. Specifically, the user selects its preference between retiring at age 62 with $70,000 of income and retiring at age 65 with $100,000 of income.

FIG. 4B illustrates an exemplary interface in accordance with another embodiment of the invention wherein a series of trade-off questions related to the attributes selected by the user or the system may be presented for the user to select a degree of preference. In this embodiment, the user selects a preference between achieving the ideal level of one attribute compared to achieving the ideal level of another attribute. The degree of preference may range from strongly preferring achieving the ideal level of the first attribute to no preference between the paired ideal levels to strongly preferring achieving the ideal level of the second attribute with varying degrees of preference in between. The exemplary interface as shown in FIG. 4B contains six examples of such trade off pairings between four different attributes, thereby allowing the user to select a preference between the ideal levels of two attributes, such as saving less and retiring early or retiring earlier and retiring with more income.

Figure 5A:
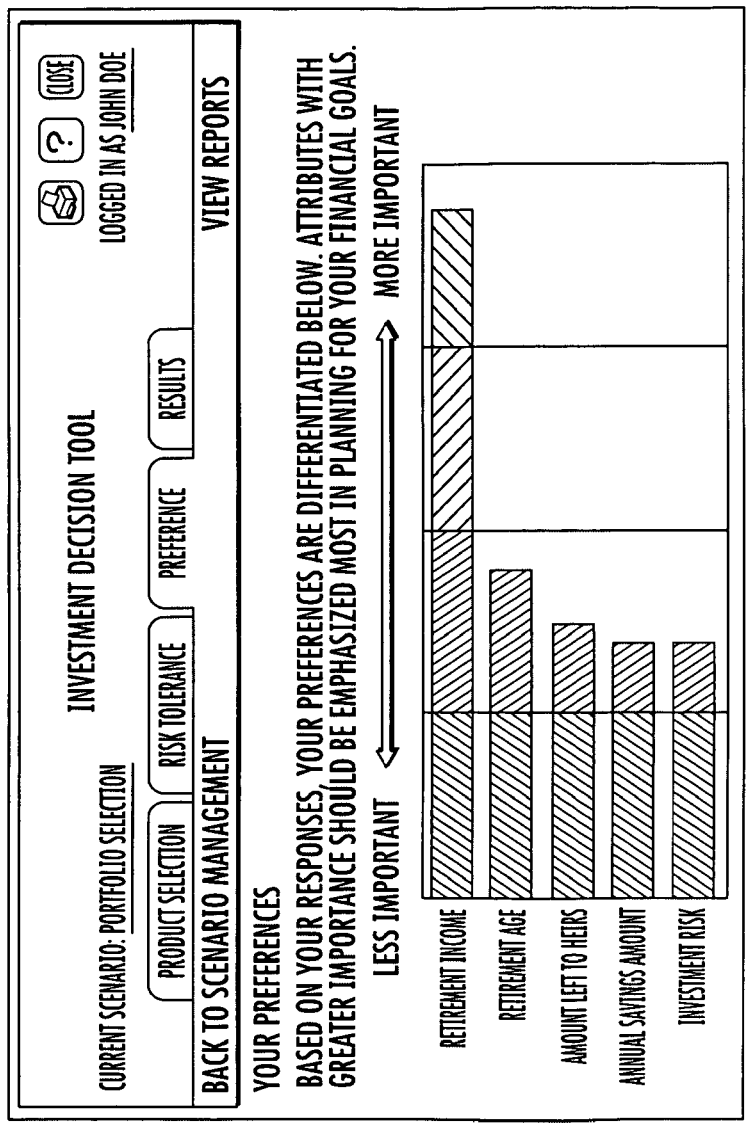

The relative value of the attributes is assessed based on the user's responses to the importance of degree of difference and trade-off questions. As previously discussed, the analysis may involve conjoint analysis or the like. Conjoint analysis involves assigning quantitative values to the user's responses to the attributes selected as important, the importance of difference questions, and the trade-off questions. The quantitative data may then be represented in a vector and matrix format, on which regression analysis may be performed to provide a single number for each selected attribute indicating a preference for how important the user feels that attribute is in relation to each of the alternatives. For example, in the importance of difference questions the importance for any single attribute may be measured on a plus-four (+4) to minus-four (−4) scale ranging from extremely important to not important. Similarly, the trade-off questions comparing trade-offs between two pairs of attribute values as described above may also be measured on a scale from +4 to −4. A Y-vector may be formed that quantitatively represents the attributes selected by the user as important, and the Y-vector may be bottom augmented by the quantitative importance of difference data. An X-matrix may also be formed representing the quantitative importance of the difference data and bottom augmented by the quantitative trade-off data. Accordingly, each row of both the Y-vector and the X-matrix may represent a single response from the user. Each column in the X-matrix may represent an attribute the user has chosen as important. Because the attributes, importance of difference questions, and trade-off questions are related to the alternatives, regression analysis performed on the Y-vector and X-matrix may provide an indication of a preference that the user has for each of the alternatives. FIGS. 5A and 5B are graphical examples of the quantified relative importance values of attributes in accordance with an embodiment of the present invention.

The relative importance values are developed to complement a financial projection engine using Monte Carlo simulation or the like which determines expected future wealth or the probability of achieving user objectives subject to user resources and constraints. The financial projection engines gather information regarding user objectives, resources, and constraints that are similar to the inputs described in the method. In these financial projection calculations, assumptions are made with regard to various future determinants of wealth and probability. Typically, these assumptions include such items as return and risk of the investment strategy, inflation and tax rates, spending rates, future financial expenditures, future income from employment and retirement plans, such as Social Security or pensions. Based on that information, financial projections are calculated by:

Producing a future cash flow analysis and determining the projected terminal wealth at the end of the user's time horizon, and/or Producing a future cash flow analysis and simulating various outcomes for one or more attributes of the plan (typically investment return).

Engines used to calculate such financial projections are widely available in the marketplace, are referred to as financial projection engines, and should be understood by those of ordinary skill in the relevant art. They include packages, such as the one provided by Intuit as part of their QUICKEN software, basic retirement calculators that might be found at the web site of mutual fund companies such as Fidelity or Vanguard, more advanced retirement calculators such as Financial Engines, or more comprehensive solutions from companies like Financeware or EISI that offers NAVIPLAN.

The financial projection engine used with the present invention may use one of multiple simulation approaches to calculate financial projections for multiple scenarios. Certain calculation methodologies may be more appropriate to analyze certain types of alternative investments while others may be satisfactory for other types. Certain calculation methodologies may not be fast enough for all situations with current technologies, but may be fast enough for satisfactory use as technology advances to improve computing capacity and bandwidth. The end result of each individual calculation is to determine whether or not the user will have enough funds to support certain life goal choices given that set of user life goal choices. Certain combinations will not provide enough money (i.e., they fail) and others will provide a sufficient amount of money ("pass"). The probability of success for that combination of life goal choices is represented by the formula:

$$\text{Probability (\%)} = \frac{\text{Numbers of Scenarios Passing}}{\sum \text{Numbers of Scenarios Passing} + \text{Numbers of Scenarios Failing}}$$

Such a simulation is commonly referred to as a "Monte Carlo simulation" and may take one of two forms as described below.

The first form may use an historical or forecasted return and standard deviation of returns, often used to define risk, which is constant throughout the length of the analysis. The mean and standard deviation may be used to simulate a significant number of possible returns, say 1000. The invention may allow the ability to constrain the extreme good and bad returns as may be deemed appropriate. For example, a configuration may be used that excludes all simulated returns more than 3σ (three standard deviations) from the mean and another configuration may exclude all simulated returns more than 4σ from the mean. The distribution of returns may be normal, log normal, or such other distribution that may be appropriate for the alternative investments being considered. These simulations will serve as the "set of potential returns" to be used for each available portfolio risk level. Background information directed to log normal distributions known to those of ordinary skill in the art can be found in JOHN L. MAGINN & DONALD L. TUTTLE, MANAGING INVESTMENT PORTFOLIOS 7-47 to 7-48 (1980), and is incorporated by reference herein.

The user will answer questions in the input portion of the process that provides the ideal and acceptable level for each objective or "life goal." These life goals may include, but are not limited to, those listed in Table A below.

TABLE A

|  | Ideal | Acceptable | Increment |
| --- | --- | --- | --- |
| Retirement Age | 60 | 70 | 1 |
| Retirement Income | $80,000 | $70,000 | $1000 |
| Savings Rate as % of Salary or $ Amount per year | 5% | 15% | 1% |
| Portfolio Risk Level | 1 (Lowest risk alternative) | 5 (Highest risk alternative) | 1 risk level |

"Retirement Income" may be a total amount of income desired and may be adjusted to include other known sources of income, such as Social Security or a defined benefit pension plan. The ideal and acceptable portfolio risk level are used to determine the mean and standard deviation to be used for the Monte Carlo simulation or historical return sampling to calculate probabilities of success.

In addition, either the user has answered questions or additional information has been provided as a default to be used for the calculations. Examples of the additional information are in Table B below.

TABLE B

| Account balance | $750,000 | This may include other assets and may be retrieved from a system that has the information or entered by the user. |
| --- | --- | --- |
| Current Age | 50 | This may be retrieved from a system or entered by the user. |
| Age at death | 85 | This may be retrieved from a mortality table and adjusted by the user. |
| Inflation rate | 3% | This will be provided as a default value, but may be overridden by the user |
| Annual wage increase above inflation | 1% | This will be provided as a default value, but may be overridden by the user |
| Current salary | $100,000 | This may be retrieved from a system or entered by the user. |
| Other Retirement Income | $ 22,000 | This may be entered by the user or retrieved from a system or estimated such as future Social Security benefits from standard tables or calculations. |

From this input information, a set of possible scenarios will be constructed to measure the utility of the life goals and the probability of having enough money to last until death. The scenarios will consist of alternate life goal choices. For each set of alternate life goals, a number of iterations will be completed to assess the probability of success with success defined as a positive or zero ending value ("account balance") at death. Examples of the set of possible scenarios are shown in Table C below. In the table, Scenario a51 and a52 are two iterations for the same set of life goals values. Scenario b51 is one iteration for a different set of life goal values.

TABLE C

|  | Scenario a51 | Scenario a52 | Scenario b51 |
|---|---|---|---|
| Retirement age | 60 | 60 | 61 |
| Retirement income | $80,000 | $80,000 | $80,000 |
| Savings rate | 5% | 5% | 5% |
| Simulated returns | First iteration for alternative 1 | Second iteration for alternative 1 | First iteration for alternative 1 |
| Notes | All life goals at ideal level | All life goals at ideal level | Age life goal has been incremented by one year |

In Table C, there are 4 life goals to change across each scenario as follows.
Retirement age—One year intervals between 60 and 70-11 levels with annual increments
Retirement income—$1000 increments between $70,000 and $80,000—11 levels with $1000 increments
Savings rate—1% increments between 5% and 15%—11 levels with one percentage point increments
Alternative risk level—5 levels based on five alternate portfolios available.

The total number of scenarios in this example is 6655 (11 levels×11 levels×11 levels×5 levels). For each of these scenarios, the simulated returns will be used across a significant number of samples. In the table above, the third character in the scenario name indicates which set of simulated returns is applied. In this table only iterations 1 and 2 are shown, but the total number may be 100 or even more. Each iteration is created via a random sampling from the "set of potential returns" described above.

The number of returns chosen from the set of potential returns will match the number of years for the analysis. For example, if the analysis is for a 40 year old with an expected age of death of 89, 50 random annual returns would be selected for Scenario 1. Then a second set of 50 returns would be selected to simulate Scenario 2. This selection of returns will continue until an appropriate number of scenarios have been calculated as described more fully in the regression section below.

A straightforward calculation is applied to each set of returns for each scenario to determine the expected ending value for the scenario. The calculation is iterative for each year from the "Current Age" to the "Age of Death" as follows. In our previous example this would require 36 annual cash flow calculations.

First year calculation:

$$EV=(BV*(1+r))+NC+(0.5*NC*r)$$

EV=Ending Value
BV=Beginning Value
r=rate of return
NC=Net contribution defined as savings or withdrawals as appropriate Subsequent year calculations are similar to the first year except that growth rates are applied to salary and retirement income. If at any time prior to death, the "Ending Value" is negative, that one scenario return iteration is a failure. If the "Ending Value" as of the "Age of Death" is zero or positive that scenario return iteration is a success. The ratio of zero or positive ending values to total iterations calculated equals the probability of success for that scenario.

Each scenario in aggregate will be further assessed based on whether or not the scenario meets an acceptable probability level of success—for example, 75%. A 75% acceptable success rate means that 75% of the iterations indicated a positive or zero ending value at the assumed age of death. In the example above if 75% of Scenarios a51 through a5n, where n is the total number of return simulations, resulted in a calculation that had enough money for success, then we would expect that more than 75% of Scenarios b51 through b5n might result in a calculation that had enough money for success because the retirement age was one year later. The change in retirement age would allow another year of contributions and postpone withdrawals for one year so the probability of achieving success would intuitively be higher.

In another embodiment, a different Monte Carlo simulation process is used. This approach to the Monte Carlo simulation would be more appropriate for alternatives where the risk and return are expected to change in future time periods referred to as "variable risk alternatives." This approach would be more appropriate when the investment alternatives include options commonly known as target "Retirement Date" or "Ideal Age" funds. These funds are managed to generally decrease the risk and associated return automatically as the investor ages or gets closer to retirement. In this case, it would not be appropriate to assume a constant risk and return for projections. The presently-described embodiment will allow for a simulation of returns for each year based on a changing set of mean and variance for each investment alternative. The changes may be provided external to the invention as data input or these changes may be scaled within the invention by using various known mean and variance combinations along an efficient frontier or other scale to allow a reasonable projection of the changes each year or other appropriate time periods. The same calculation process described above for a constant risk alternative would then be applied using the variable risk simulation data.

While some financial projection tools incorporate analysis of target and satisfactory levels of attributes that are similar to the inputs required by the method of conjoint analysis, AHP, or the like, these tools focus on calculating the probability of achieving those levels rather than the user's satisfaction or utility that will be produced by achieving particular levels. Most financial projection tools ask the user for single point targets for objectives, resources, and constraints. Example targets are the retirement age=62, savings rate=$10,000 per year, and retirement income=$80,000 per year. In such cases, the method will require the user to provide the satisfactory levels in addition to the target levels for each attribute as additional information. Examples compared to the previous targets might have satisfactory levels of retirement age=66, savings rate=$14,000 per year, and retirement income=$50,000 per year. The end result of the probability-based financial projections is a percentage probability, sometimes transformed to categories, graphics, charts, or alternate scoring models, of achieving user objectives subject to user resources and constraints. When the probability of achieving objectives is judged to be too low by the user and/or his/her advisor, a series of scenarios and what-if analyses are performed to assess alternate levels that would result in a reasonable probability of achieving objectives. This effort is subjective and iterative, typically requiring multiple iterations to arrive at a solution that makes adjustments that are palatable to the user.

The invention uses the relative importance of the life goals established through the importance and trade off questions described earlier to eliminate the iterative process and maximize the user satisfaction, expressed as utility, while still achieving an acceptable probability of having enough money to last until death. The combination of the two processes is performed as follows.

Referring back to the example input data allows us to see how these two processes are combined. The original inputs showed the range of ideal and acceptable bounds for each life goal as displayed in Table D below. The "Relative Importance" shown in Table D is determined from the importance and trade-off questions described above.

TABLE D

|  | Ideal | Acceptable | Relative Importance |
|---|---|---|---|
| Retirement Age | 60 | 70 | 20% |
| Retirement Income | $80,000 | $70,000 | 30% |
| Savings Rate as % of Salary or $ Amount per year | 5% | 15% | 30% |
| Portfolio Risk Level | 1 (Lowest risk alternative) | 5 (Highest risk alternative) | 20% |

Table E portrays two scenarios for different sets of life goal levels. The life goal levels fall within the range described by the "Ideal" and "Acceptable" levels in Table D. We can see that these scenarios differ for both "Retirement Age" and "Retirement Income."

TABLE E

|  | Scenario a51-a5n | Scenario p51-p5n |
|---|---|---|
| Retirement age | 60 | 64 |
| Retirement income | $80,000 | $75,000 |
| Savings rate | 5% | 5% |
| Risk Level | 5 | 5 |

It's desirable to determine the difference in utility to the user among the two scenarios. Since different factors have different units (such as years and dollars), a common relative score must be calculated. Using age as an example the following calculation is used to compute Relative Score.

Age Score=$(1-(A_{sc}-A_t)/(A_a-A_t))*100=(1-(64-60)/(70-60))*100=60$, where $A_{sc}$=Retirement age for this scenario
$A_t$=Ideal retirement age
$A_a$=Acceptable retirement age Table F shows the components to the utility calculation. The "Relative Importance" value for each life goal attribute is constant for each scenario assessed. For instance, the 20% relative importance value for "Retirement Age" would be applied to each of the 6655 scenarios that were referred to in the discussion of Table C above. The values in the Scenario columns are converted to "Relative Scores" using the calculation illustrated above for age. The "Total Score" (or total utility) is the sum of the products of the individual "Relative Importance" and "Relative Scores." In the table below, the calculation of the Total Score for Scenario a51-a5n is:

(20%*100)+(30%*100)+(30%*100)+(20%*0).

Each of the life goal attributes for this scenario is at the ideal level except risk which is at the acceptable level.

TABLE F

|  | Relative Importance | Scenario a51-a5n | Relative Score | Scenario p51-p5n | Relative Score | Scenario p51-p5n |
|---|---|---|---|---|---|---|
| Retirement age | 20% | 60 | 100 | 64 | 60 | 64 |
| Retirement income | 30% | $80,000 | 100 | $75,000 | 50 | $75,000 |
| Savings rate | 30% | 5% | 100 | 5% | 100 | 5% |
| Risk Level | 20% | 5 | 0 | 5 | 0 | 5 |
| Total Score |  |  | 80 |  | 57 |  |
| Probability of Success |  |  | 77% |  | 82% |  |

In this example both scenarios have a probability of success which we have said is acceptable. But the "Scenario a" has a higher utility score than the "Scenario p." This is intuitive when comparing these two scenarios directly because the "Retirement Age" is later and the "Retirement Income" is lower in "Scenario p". In this example, "Scenario a" would be preferred. When hundreds or thousands of scenarios are created, and some factors get better while others get worse, the comparison is not so intuitive.

Figure 6A:
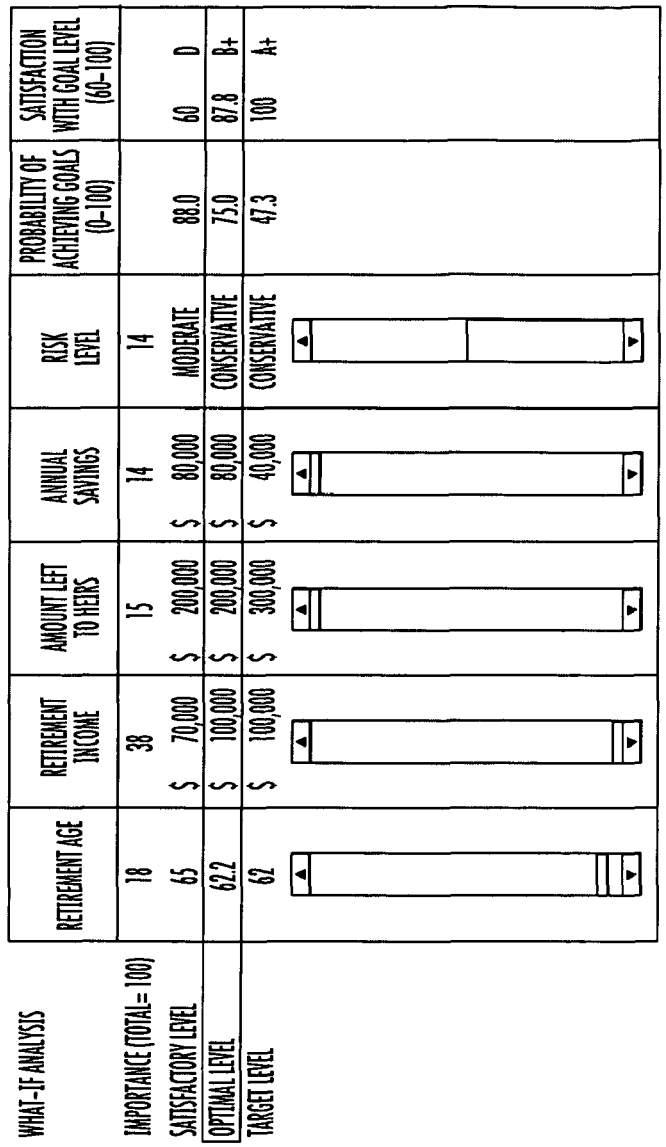
Figure 6B:
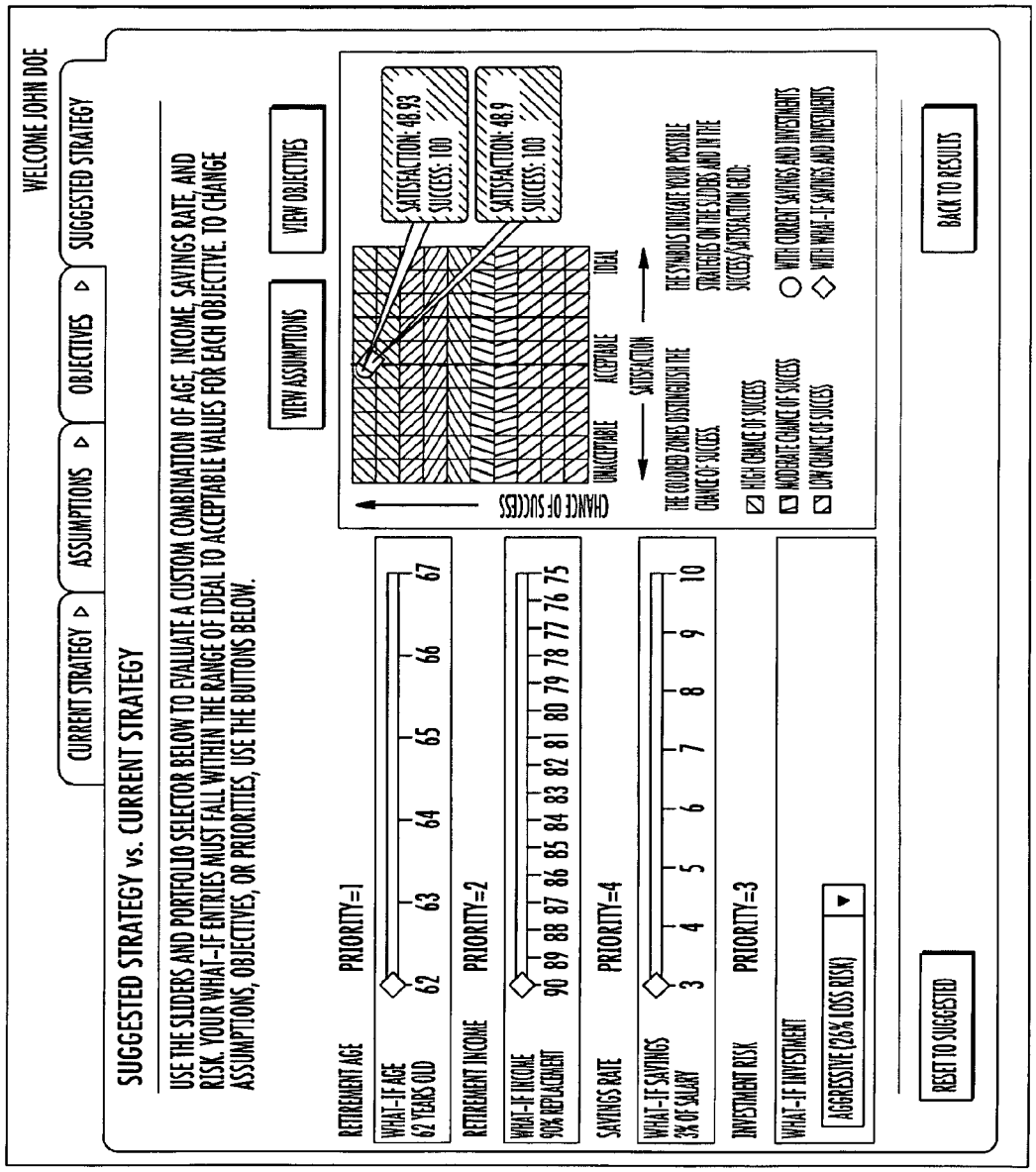

The invention presents the user with the scenario having the highest utility that passes the minimum acceptable probability of success. If two portfolios have the same utility, the one with the higher probability of success will be ranked higher. This eliminates the iterative process that occurs with other retirement and financial planning software. The invention may also allow the user to adjust the various inputs using "sliders" or other data entry methods to observe how other combinations might affect the outcomes. FIGS. 6A and 6B illustrate exemplary interfaces that present scenarios exhibiting the highest utility and that pass the minimum acceptable probability of success. These exemplary interfaces also incorporate sliders that may be used to adjust inputs in order to demonstrate the outcome of various combinations.

In one embodiment, the process includes a combination of a regression-based approach to simplify the what-if analyses process and an optimization that maximizes the utility of the user's preferences as constrained by the regression analysis. Both the regression analysis and the optimization calculation are widely-used mathematical processes that can be solved using spreadsheets or other widely-available mathematical computer subroutines.

The regression analysis, typically, but not always, a log-normal, least squared regression with an intercept, determines the change in probability of achieving plan objectives as determined by Monte Carlo simulation or the like for changes in user objectives, resources, and constraints in order to simplify and streamline the what-if analysis required when the probability of achieving plan goals is lower than desired. This process is embodied in a multi-step process.

First, several iterations or scenarios of the simulation are performed with different sets of input data ranging from ideal to acceptable levels for each goal. The number of scenarios must be adequate to establish the relationship of the change in each variable to the change in user utility for life goal choices. The actual number may vary depending on what variables are being used, such as retirement age, savings rate, etc. The probability of success of achieving the life goal objectives as calculated in these scenarios serves as the dependent variable in the regression analysis. The user-selected attributes, such as retirement age, savings rate, retirement income, and risk level, serve as the independent variables. Only three scenarios are shown in Table G for this example, but more scenarios would be calculated depending on the number of variables in the analysis.

TABLE G

| | Retirement Age | Savings Rate | Retirement Income | Risk Level | Probability of Success (Calculated) |
|---|---|---|---|---|---|
| Scenario 1 | 62 | $10,000 | $80,000 | Conservative | 60% |
| Scenario 2 | 64 | $12,000 | $70,000 | Moderate | 65% |
| Scenario 3 | 66 | $14,000 | $50,000 | Aggressive | 70% |

In general multiple regression procedures will estimate a linear, or non-linear of an appropriate form and relationship, of the form:

$$Y=b_1*X_1+b_2*X_2+\ldots+b_n*X_n+a$$

where, in this example,
Y=Probability of success
X=the variables, such as:
$X_1$=Retirement Age
$X_2$=Savings Rate
$X_3$=Retirement Income
$X_4$=Risk Level
$b_1$-$b_n$=Regression coefficients of the respective independent variables
a=intercept The regression analysis results in an equation that can be used to estimate the probability of achieving a different set of objectives subject to a different set of resources and constraints.

Since the regression equation can be calculated nearly instantaneously, the time savings is maximized relative to calculating a separate simulation for each what-if scenario analysis for a corresponding change in the level of a selected attribute. This method is intended to provide an acceptable solution to the user in a reasonable amount of time, so the time savings is significant when compared to running multiple iterations on a trial and error basis.

The next step in the method is to solve an optimization equation that maximizes the user's utility based on the relative importance of attributes subject to the constraint of a minimum level of "Probability of Success" and/or maximum combination of "Probability of Success" and satisfaction with goal attribute levels. The equation that expresses the user's utility can be expressed as follows:

$$U=c_1*X_1+c_2*X_2+\ldots+c_n*X_n+a$$

where, in this example,
U=User utility (value to be maximized)
X=the variables, such as:
$X_1$=Retirement Age
$X_2$=Savings Rate
$X_3$=Retirement Income
$X_4$=Risk Level
$c_1$-$c_n$=Coefficient of relative importance of the respective independent variables from preference analysis
a=intercept The optimization equation is set to solve for the maximum "U" (user utility) subject to the constraint of "Y" (the "Probability of Success") being equal to or greater than a predetermined minimum number. In current financial services life goal plans, this probability is usually set between 75% and 90% depending on the age of the user. An older user with less time to recover from bad results will usually feel more comfortable with a higher "Probability of Success."

The results of the optimization is a unique combination of the attributes each set to an optimum level that maximizes the user utility while meeting the "Probability of Success" constraint. The attribute levels are then input into the financial projection engine for a final result. Since the regression equation is an estimate of how the variables are related to one another, it is possible that a minor adjustment to one or more variables may be necessary at this point in order to meet the desired probability as calculated by the actual financial planning engine. The method described will allow those adjustments to be made using the attributes that are least important to the user and a high satisfaction level with the final plan, however, will still be the result.

Figure 7:
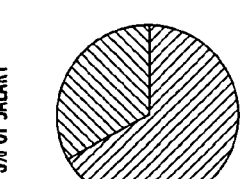

The output of the invention will be a form to show the user the optimum combination of life goal choices to maximize the utility while still meeting the minimum probability of success. In addition, other alternative solutions will be presented to allow the user to make a judgment as to the final solution chosen. If no scenario meets the minimum probability of success, a scenario may be created that shows the retirement income that may be provided at that minimum probability of success if all of the life goal choices are set at the "worst case" or acceptable level. FIG. 7 is an exemplary representation that shows the comparison of the current investment strategy and savings rate with a suggested investment strategy and savings rate along with the chance of success and how close the Suggested Strategy is to achieving the ideal life goals.

The method has been described using the regression approximation to make the time for calculation and optimization acceptable to the user. Alternatively, if the calculation speed of the financial projection engine is fast enough, the same optimization process can be applied directly to the engine rather than estimated using a regression equation relationship of the important attributes.

It should be understood that the system and method described above may be performed through the use of one or more computer programs.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for selecting between life goal alternatives, the method comprising the steps of:
   presenting one or more risk tolerance questions to a user;
   receiving a response from the user to the one or more risk tolerance questions;
   determining a risk tolerance for the user based on the response to the one or more risk tolerance questions by the user;
   presenting a plurality of attributes associated with a plurality of life goal alternatives for selection by the user;
   receiving at least two selections of the plurality of attributes made by the user;
   receiving a desired value and an acceptable value from the user for each of the plurality of attributes selected by the user;
   presenting an importance of difference question to the user for each of the plurality of attributes selected by the user;
   receiving a response from the user to each importance of difference question;
   presenting a tradeoff question to the user for each of at least one combination of two of the plurality of attributes selected by the user;
   receiving a response by the user to each tradeoff question;
   determining a degree of preference for each of the at least one combination of the two of the plurality of attributes selected by the user based on the response from the user to each tradeoff question;
   automatically creating by a computer a plurality of life goal scenarios through the use of said computer based on the desired and acceptable values for each of the plurality of attributes selected by the user;
   automatically identifying a subset of the plurality of life goal scenarios using the computer based on the risk tolerance for the user, the plurality of attributes selected by the user, the response received from the user to each importance of difference question, and the degree of preference for the at least one combination of the two of the plurality of attributes selected by the user;
   automatically calculating by said computer a utility value and a success value for each of the subset of the plurality of life goal scenarios using the computer;
   automatically ranking the subset of the plurality of life goal scenarios using the computer based on the utility and success values for each of the subset of the plurality of life goal scenarios;
   removing from the subset of the plurality of life goal scenarios any life goal scenario associated with a success value less than a predefined success threshold to obtain a remaining subset of life goal scenarios; and
   presenting, by said computer, the remaining subset of the plurality of life goal scenarios.

2. The method of claim 1, wherein the step of automatically identifying a subset of the life goal scenarios is accomplished using conjoint analysis or analytic hierarchy process.

3. The method of claim 1, wherein the step of presenting an importance of difference question to the user comprises presenting a plurality of importance of difference questions to the user.

4. The method of claim 3, wherein the step of presenting a tradeoff question to the user comprises presenting the tradeoff question to the user for each combination of two of the plurality of attributes selected by the user.

5. The method of claim 4, wherein the step of determining a degree of preference for each of the at least one combination of the two of the plurality of attributes selected by the user comprises determining a degree of preference for each combination of two of the plurality of attributes selected by the user based on the response to the respective tradeoff question for the respective combination of two of the plurality of attributes selected by the user.

6. The method of claim 1, wherein the step of determining a risk tolerance for a user comprises determining a maximum risk tolerance for the user based on the response by the user to the one or more risk tolerance questions.

7. The method of claim 1, further comprising the step of creating a financial projection for each of the subset of the plurality of life goal scenarios.

8. The method of claim 7, wherein the step of calculating a financial projection for each of the subset of the plurality of life goal scenarios is accomplished via a Monte Carlo simulation.

9. The method of claim 1, wherein the step of determining a risk tolerance for the user is accomplished via a utility theory.

10. The method of claim 1, wherein the step of removing from the subset of the plurality of life goal scenarios any life goal scenario associated with a success value less than a predefined threshold is automatically accomplished through the use of the computer.

11. The method of claim 1, further comprising presenting a plurality of importance of difference questions for each of the plurality of attributes selected by the user.

12. The method of claim 1, further comprising automatically creating a financial projection for each of the life goal scenarios through the use of the computer.

13. The method of claim 1, further comprising presenting a plurality of tradeoff questions for each combination of the plurality of attributes selected by the user.

14. The method of claim 1, wherein the step of presenting a tradeoff question to the user for each of at least one combination of two of the plurality of attributes selected by the user comprises presenting the tradeoff question to the user for each of a plurality of combinations of two of the plurality of attributes selected by the user.

15. The method of claim 14, wherein the step of determining a degree of preference for each of the at least one combination of the two of the plurality of attributes selected by the user based on the response from the user to each tradeoff question comprises determining a degree of preference for each of the plurality of combinations of two of the plurality of attributes selected by the user.

16. The method of claim 15, wherein identification of the subset of the plurality of life goal scenarios is based on the degree of preference for each of the plurality of combinations of two of the plurality of attributes selected by the user.

17. The method of claim 1, further comprising automatically determining a relative importance value for each of the at least two selections of the plurality of attributes made by the user through the use of a computer based on responses from the user to each importance of difference and tradeoff question.

18. The method of claim 17, wherein the step of automatically determining a relative importance value for each of the at least two selections of the plurality of attributes is accomplished via regression analysis.

\* \* \* \* \*